US010404575B2

(12) United States Patent
McDonald et al.

(10) Patent No.: US 10,404,575 B2
(45) Date of Patent: Sep. 3, 2019

(54) SWITCHING DEVICE HAVING PORTS THAT UTILIZE INDEPENDENTLY SIZED BUFFERING QUEUES

(71) Applicant: HEWLETT PACKARD ENTERPRISE DEVELOPMENT LP, Houston, TX (US)

(72) Inventors: Nicholas McDonald, Fort Collins, CO (US); Alan Davis, Fort Collins, CO (US)

(73) Assignee: HEWLETT PACKARD ENTERPRISE DEVELOPMENT LP, Houston, TX (US)

( * ) Notice: Subject to any disclaimer, the term of this patent is extended or adjusted under 35 U.S.C. 154(b) by 0 days.

(21) Appl. No.: 15/715,026

(22) Filed: Sep. 25, 2017

(65) Prior Publication Data
US 2019/0097915 A1    Mar. 28, 2019

(51) Int. Cl.
*H04L 12/733* (2013.01)
*H04L 12/801* (2013.01)
*H04L 12/861* (2013.01)
*H04L 12/933* (2013.01)
*H04Q 11/00* (2006.01)

(52) U.S. Cl.
CPC ............ *H04L 45/122* (2013.01); *H04L 47/12* (2013.01); *H04L 49/109* (2013.01); *H04L 49/15* (2013.01); *H04L 49/90* (2013.01); *H04L 47/39* (2013.01); *H04Q 11/0003* (2013.01)

(58) Field of Classification Search
CPC ....... H04L 45/122; H04L 49/90; H04L 47/12; H04L 47/39; H04Q 11/0003
See application file for complete search history.

(56) References Cited

U.S. PATENT DOCUMENTS

| 7,277,449 | B2 | 10/2007 | Garinger et al. |
| 7,340,585 | B1 | 3/2008 | Ganesan et al. |
| 7,490,189 | B2* | 2/2009 | Eberle .................... H04L 49/109 361/734 |
| 7,840,136 | B1* | 11/2010 | Cunningham ........... H04Q 3/66 385/16 |
| 2002/0141427 | A1 | 10/2002 | McAlpine |
| 2004/0153566 | A1* | 8/2004 | Lalsangi ................. H04L 47/10 709/234 |
| 2005/0220025 | A1* | 10/2005 | Noguchi ................. H04L 47/10 370/235 |
| 2007/0291535 | A1* | 12/2007 | Eberle .................... H04L 49/109 365/174 |

(Continued)

OTHER PUBLICATIONS

Concer, N. et al.; "Distributed Flit-buffer Flow Control for Networks-on-chip"; Oct. 19-24, 2008; 6 pages.

(Continued)

*Primary Examiner* — Brian D Nguyen
(74) *Attorney, Agent, or Firm* — Mahamedi Paradice LLP

(57) ABSTRACT

A switching device comprising a substrate and multiple switches connected to the substrate to provide a switching function. Each of the multiple switches includes a plurality of ports that each utilize a corresponding connection to another switch or to an external device. Each of the ports of each switch are associated with an independently sized buffering queue, with a buffering queue size of at least a first port being different than a buffering queue size of a second port.

20 Claims, 3 Drawing Sheets

(56) References Cited

U.S. PATENT DOCUMENTS

2016/0344629 A1    11/2016   Gray
2017/0118140 A1*   4/2017   Lu .......................... H04L 45/745
2018/0308783 A1*   10/2018   Refai-Ahmed ..... H01L 23/3675

OTHER PUBLICATIONS

Hu, J. et al.; "Application-specific Buffer Space Allocation for Networks-on-chip Router Design"; May 19, 2012; 8 pages.
Kim, J.; "High-radix Interconnection Networks"; Mar. 2008; 158 pages.
Michelogiannakis, G. et al.; "Router Designs for Elastic Buffer On-chip Networks"; Jun. 3, 2009; 14 pages.
Passas, G. et al.; "Uber: Utilizing Buffers to Simplify NoCs for Hundreds-cores"; Jul. 27, 2016; 5 pages.
European Search Report and Search Opinion Received for EP Application No. 18195403.3, dated Jan. 22, 2019, 10 pages.

\* cited by examiner

SWITCHING DEVICE HAVING PORTS THAT UTILIZE INDEPENDENTLY SIZED BUFFERING QUEUES

STATEMENT OF GOVERNMENT RIGHTS

This invention was made with Government support under Agreement No. N66001-13-2-4003 awarded by DARPA. The Government has certain rights in this invention.

BACKGROUND

In general, higher radix switching devices can be built by connecting multiple smaller radix switches, typically on a single die. Decreasing the footprint of the smaller radix switches provides more area on the die and, accordingly, allows more of the smaller radix switches to be included on the die, resulting in even higher radix switching devices.

Smaller radix switches utilize buffering queues to create temporary storage areas for data packets before the data packets proceed through a network. Conventional approaches often size buffering queues uniformly to meet greatest buffering need. While the large buffering queues are necessary to prevent buffer overrun for data packets traveling long distances (e.g., from a data center), these large buffering queues can be excessive for data packets traveling shorter, more controlled distances (e.g., from one small radix switch to another), unnecessarily occupying space on the die.

DETAILED DESCRIPTION

An example switching device is provided that utilizes individual switches with varying buffering queue sizes. In particular, an example switching device includes multiple switches connected to provide a switching function on a substrate. Each of the multiple switches may include multiple ports, and each port may utilize a corresponding connection. As described with various examples, each of the multiple ports may be associated with an independently sized buffering queue. Further, a buffering queue size of at least a first port may be different than a buffering queue size of a second port.

According to some variations, a switching device includes switches having multiple ports with respective buffering queues that manage differing quantities of incoming and outgoing data packets. For example, for a particular switching device, a buffering queue that receives data packets from remote locations (e.g., a data center 100 meters away) may need to be sized differently than a buffering queue on the same switching device that receives data packets from close locations (e.g., another switch on the switching device 100 a few millimeters away) in order to optimize the switching function of the switching device. In some examples, a switching device includes switches having ports that utilize intra-device connections (e.g., electrical or optical), as well as ports that utilize connections (e.g., electrical or optical) to external devices. By way of example, the buffering queue size of ports that utilize intra-device connections may be significantly smaller than the buffering queue size of ports that utilize connections to external devices. In other examples, the buffering queue size of ports that utilize connections to external devices may be smaller than the buffering queue size of ports that utilize intra-device connections (e.g., multi-chip modules on a 2.5D package comprising a switch and a System-on-a-Chip).

By varying the size of buffering queues as described, examples can tailor the buffering queues of individual ports on a switching device to be sized enough to avoid data packet loss but not more than enough to avoid other disadvantages (e.g., unused space on the substrate, added energy consumption, etc.). In contrast, conventional approaches utilize buffering queues of uniform size, typically to accommodate ports of greatest buffering need. As compared to such conventional approaches, examples reduce a buffering queue size or need on a switch of a switching device. Among other benefits, examples conserve space on the switching device, which in turn may facilitate performance of the switching device, and/or reduce manufacturing costs by eliminating costly buffering queues. Furthermore, varying the size of buffering queues provides the ability to place the queuing where it makes the biggest performance impact.

Figure 1:
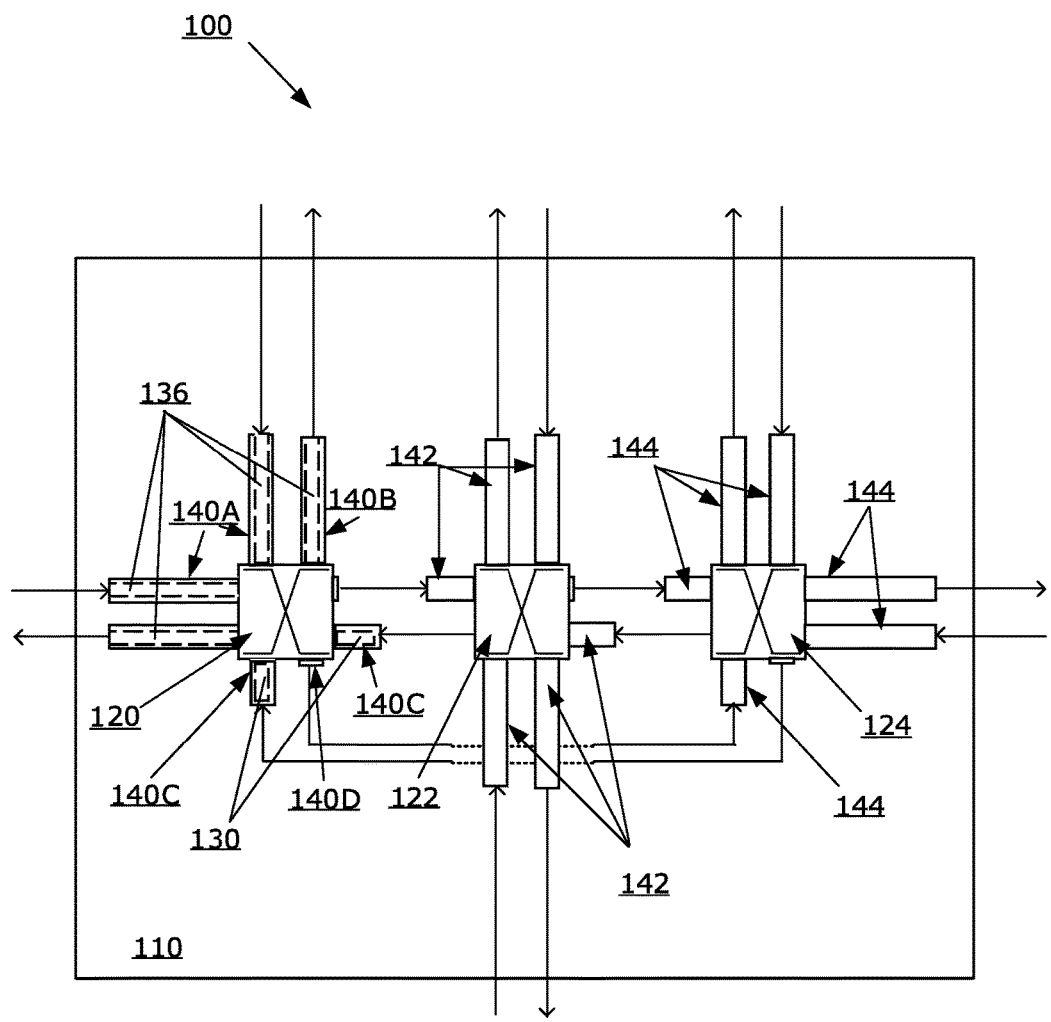
FIG. 1 illustrates an example switching device with multiple switches interconnected by an individual substrate.

FIG. 1 illustrates an example switching device with multiple switches interconnected by an individual substrate. In particular, a switching device 100 may be implemented for a network computing environment, such as for switching devices and connected computers that utilize various connections (e.g., optical fiber, electrical cable, etc.). By way of example, the switching device 100, as shown in FIG. 1, may correspond to a network switching device utilized in high radix hierarchical switch architectures. For example, in a Network-on-a-Chip ("NoC") communication system, a switching device may route data packets between multiple intellectual property cores ("IP cores") included with a System-on-a-Chip ("SoC"), although other examples are contemplated. With respect to examples as described, a data packet may correspond to a unit of data that can include control information and user data (e.g., source and destination network addresses, sequencing information, etc.).

With reference to FIG. 1, the switching device 100 includes multiple switches 120, 122, 124 provided on a substrate 110. The substrate 110 can be formed from, for example, semiconducting material (e.g., silicon, gallium arsenide, etc.). The substrate 110 may correspond to, for example, a die or chip that includes a set of circuits (e.g., electrical integrated circuits, photonic integrated circuits, etc.).

The switching device 100 can include multiple switches 120, 122, 124, and each switch may function to route data packets or signals along a respective connection. In an example of FIG. 1, the switches 120, 122, and 124 combine to provide a switching function. For example, the switches 120, 122 and 124 may combine to function as a logical switch that routes incoming data packets signaled from an external device to one or multiple other external devices. Additionally, in some examples, the switching device 100 can route credit returns from an external device through buffering queues utilized by a given output port (or set thereof). In an aspect, the credit returns are sent to external devices via the buffering queues utilized by input ports and respective external connections. In other aspects, the credit returns are sent through buffering queues utilized by internal ports to other connections (e.g., sub-router connections). Examples account for credits and identify paths for credit returns, in order to size the respective buffering queues that are utilized for handling credit returns.

In examples of FIG. 1, each switch 120, 122, 124 includes multiple respective ports 140 (shown individually by type as 140A, 140B, 140C and 140D), 142, 144 that form connections with other switches or devices. The individual ports 140, 142, 144 of each respective switch 120, 122, 124 may be designated by type and/or with respect to the type of connection that is utilized. In examples, each port may be identified as (i) one of an external or internal port, and (ii) one of an input or output port. Thus, for example, the switch 120 may include an external input port 140A which forms a connection with an external device, an external output port 140B which forms a connection for an output signal to an external device, an internal input port 140C which enables an intra-device signal connection to receive an input signal from an internal output port of another switch 122, 124 of the switching device 100, and an internal output port 140D which forms an intra-device connection to an internal input port of another switch 122, 124 of switching device 100.

On each switch 120, 122, 124, at least some of the individual ports 140, 142, 144 include a respective buffering queue 136 (shown for switch 120) such that each port of each switch is associated with an independently sized buffering queue. The respective buffering queues 136 of individual respective ports 140, 142, 144, may correspond to a physical storage medium (e.g., semiconductor memory) which temporarily stores data packets before transfer. Since the region of the physical storage medium occupied by a buffering queue is dependent on the size of the buffering queue, using independently sized buffering queues reduces the amount of space that the switching device 100 needs to dedicate for buffering queues. As such, examples recognize that larger buffering queues occupy more space on the physical storage medium than smaller buffering queues.

As described with various examples, individual ports 140, 142, 144 of each respective switch 120, 122, 124 may be associated with an independently sized buffering queue. For example, a buffering queue size may be based on a length of the connection, such as a connection from a remote location (e.g., data center) or a close location (another switch on the switching device 100). In addition, the buffering queue size may be based on whether the respective port is (i) an external or internal port, and/or (ii) an input or output port. Thus, individual switches 120, 122, 124 of the switching device 100 may employ respective ports 140, 142, 144 that have different buffering queue sizes. In particular, the selection of the buffering queue size for individual ports 140, 142, 144 may be tailored to the port type to accommodate any particular requirements of the port type. For example, on switch 120, the external input port(s) 140A is configured to have a relatively large size, in order to accommodate the large amount of data that is carried on an incoming connection (e.g., a fiber optic cable). Similarly, the internal input port(s) 140C of switch 120 may utilize a buffering queue that is of a relatively smaller size (as compared to the external input port 140A), as the intra-device signal connection has a physical dimension that is of orders of magnitude less than, for example, a connecting cable of the external input port 140A. The switch 120 may also have the internal output port(s) 140D configured to not have any buffering queue, or a minimal buffering queue, such that the buffering queue size of the internal output ports 140D are minimal or even non-existent (e.g., zero). Likewise, the external output port(s) 140D may have an optional buffering queue and buffering queue size. In this way, the switch 120 may include ports 140 that have buffering queues of varying size, based on considerations that include the type of connection that is formed with the particular port (e.g., input or output, internal or external), the dimension of the connection (e.g. length of fiber optic cable), and the medium that is employed on the respective connection (e.g., optical versus electrical).

Examples recognize conventional approaches that account for credits for output ports that utilize homogeneous buffering queues (e.g., every output port utilizes a corresponding buffering queue). Under such approaches, credit accounting for each output port relates to the credits of its corresponding buffering queue. However, in some examples provided herein, the buffering queue for a given output port may be non-existent (e.g., zero). In such examples, credit accounting for each output port relates to the credits of the connecting (e.g., downstream) input port and its corresponding buffering queue. In this way, the examples provided may account for credits differently based on the aspects of each port.

In variations, the size of the buffering queues may also be determined from other considerations, such as, for example, a dimension of the connection (e.g., length of fiber optic cable) being formed with the particular port, and/or the signal medium (e.g., electrical or optical) used by the connection of that port, among other considerations. Thus, in some examples, the switch 120 may include buffering queues of different sizes for ports that form the same type of connection.

According to examples, each switch 120, 122, 124 may include ports 140, 142, 144 that are configured with buffering queues, as described with switch 120. Thus, the buffering queue size of individual ports on each switch may vary, based on considerations such as the type of connection that is formed with that port, the dimension (e.g., length) of the connection formed with the port, and/or the connection medium (e.g., electrical or optical) used by that port.

According to examples of FIG. 1, the switching device 100 utilizes a significantly lesser amount of buffering queue capacity as compared to conventional approaches, which typically utilize buffering queues that are uniformly sized to accommodate the port(s) of greatest need. Under such conventional approaches, the buffering queue sizes of external and internal input ports may be uniform, even though the buffering queue size of the internal input ports is significantly less than those of the external input ports. In contrast, switching device 100 enables reduction of buffering queue sizes, so as to conserve 'real-estate' that would otherwise be occupied by larger buffering queues, as well as reduce delays and excessive energy consumption experienced with oversized buffering queues. By reducing the use of buffering queues, the switching device 100 can thus be made smaller to enhance the per dollar and per watt performance of the switching device. As an addition or variation, reducing the use of buffering queues may also enable the implementation of higher performance features, such as enabling the inclusion of additional switches to enhance performance, and/or otherwise enhancing the switching function performed by the switching device 100.

Additionally, examples such as provided with FIG. 1 enable a switching device to be implemented that tailors the use of buffering queues to a desired use. The buffering queues can be positioned and sized to accommodate a threshold capacity. In some examples, the threshold capacity can be based on the length of the external connection, with adjustment (e.g., doubling) to account for delayed credit returns through the same connection and other delays (e.g., switching reaction times). Examples may selectively size buffering queues to accommodate a determined threshold capacity, with added safety measures to ensure reliability. In this manner, examples enable buffering queues to be tailored in size with respect to individual ports of the switches, based on a calculation of threshold capacity that is specific to that port or switch.

Figure 2:
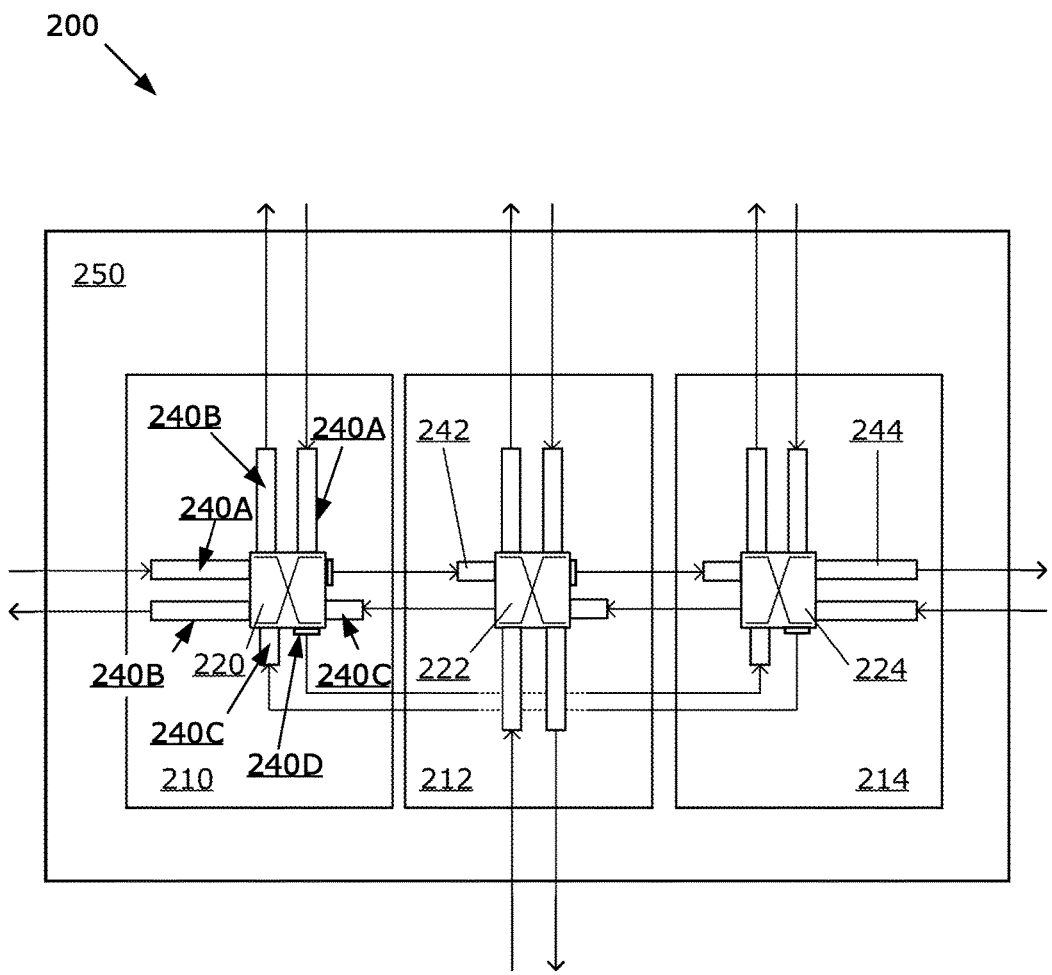
FIG. 2 illustrates an example switching device having multiple switches provided on different substrates.

FIG. 2 illustrates an example switching device having multiple switches provided on different substrates. As shown in FIG. 2, a switching device 200 includes switch 220 provided on substrate 210, switch 222 provided on substrate 212, and switch 224 provided on substrate 214. Additionally, the respective substrates 210, 212, 214 may be interconnected by a backplane 250. In variations, more or fewer substrates 210, 212, 214 may be utilized, and multiple switches 220, 222, 224 may be provided on respective substrates. The respective substrates 210, 212, 214 may be interconnected by a backplane 250, such as an interposer or printed circuit board ("PCB"). The switches 220, 222, 224 may be arranged in a desired logical arrangement (e.g., hierarchical) to perform a desired switching function.

In an example of FIG. 2, each switch 220, 222, 224 may include multiple ports 240, 242, 244. The switch 220, which is representative of other switches 222, 224 of switching device 200, includes each of an external input and output port 240A, 240B, which extend connections to and from devices that are external to or from the backplane 250. The switch 220 may also include internal input and output ports 240C, 240D, each of which extend connections between switches on different substrates 210, 212, 214. As described with an example of FIG. 1, each of the ports 240A, 240B, 240C, and 240D of the switch 220 may include a buffering queue that is associated with a queue size that is specific to the type of connection provided through that port. For example, with respect to switch 220, the internal input port 240C may include a buffering queue of sufficient size to accommodate a particular flow of data packets from another switch 222, 224. Likewise, an external input port 240A may include a buffering queue of sufficient size to accommodate an extended connection from an external device. The external and internal output ports 240B, 240D may have optionally smaller or non-existent buffering size queues. Thus, the buffering queue size of ports may vary based on whether the port is an input or output port, or for an internal or external device.

According to some examples, the backplane 250 is implemented as an interposer and includes surface-mount packaging with electrical contacts on the underside of the package (not shown in FIG. 2) that enable an electrical connection between the multiple switches and an underlying layer (e.g., SoC, printed circuit board, etc.). For example, the electrical contacts can take the form of solder balls (e.g., ball grid array, fine ball grid array, etc.), pins/flat contacts (e.g., land grid array), as well as various other forms.

In variations, the backplane 250 may be implemented as a PCB or other substrate device that includes packaged devices that include respective switches 220, 222, 224. In such examples, the switches 220, 222, 224 may be interconnected as packaged or by other switching devices using, for example, PCB conduction paths (e.g., traces, backplane traces, short cables, etc.).

Still further, in variations, the backplane 250 may provide an optical or electrical connection. For example, switches 220, 222 and 224 may utilize optical or electrical connections (e.g., cables) for both internal and external connections. In such examples, the size of the buffering queues associated with respective ports of switches 220, 222, and 224 may be selected to accommodate a particular flow of data packets transferred by the respective connections.

Figure 3:
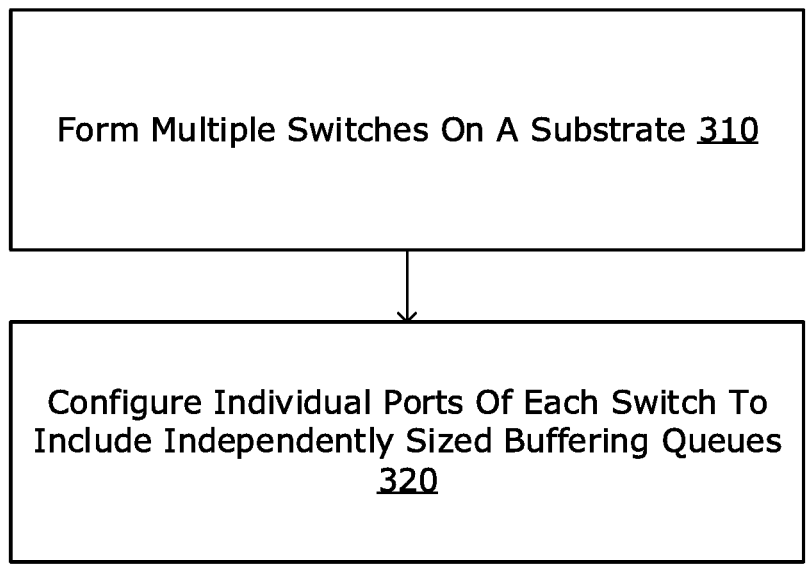
FIG. 3 illustrates an example method for creating a switching device.

FIG. 3 illustrates an example method for creating a switching device. A method such as described by an example of FIG. 3 can be implemented to create switching devices, such as described with examples of FIGS. 1 and 2.

With respect to an example of FIG. 3, a designer may interact with a computer system to specify design parameters and configurations for creating an example switching device. In some examples, a designer may utilize an electronic design automation ("EDA") tool or similar program to implement an example method of FIG. 3.

With reference to an example of FIG. 3, multiple switches may be formed or otherwise designed on a substrate, and each switch may be interconnected to enable a switching function (310). As described with examples of FIG. 1 and FIG. 2, the individual ports of each switch may be configured to include independently sized buffering queues sized to accommodate a particular flow of data packets transferred by a corresponding connection of that port (320). The connection may be determined in part by characteristics such as a physical dimension (e.g., length) of a cable or signal path and/or type (e.g., optical, electrical), among other characteristics. Thus, for example, intra-device connections may utilize significantly smaller (e.g., one or more orders of magnitude) buffering queue sizes, which in turn, can facilitate performance of the switching device (e.g., more switches can be used with available space), or by reducing cost by reducing expensive of buffering queues.

According to some examples, the buffering queues may also be sized to accommodate credit return flows. For example, the switching paths of credit returns may be predetermined, such that, for example, a given credit return may be received through a switch path that includes a buffering queue utilized by an output port, one or more buffering queues utilized by internal ports, and/or a buffering queue utilized by an input port. To accommodate the separate flow, select buffering queues (e.g., those which may handle the credit returns) may be adjusted (e.g., doubled).

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mention of the particular feature. Thus, the absence of describing combinations should not preclude having rights to such combinations.

What is claimed is:

1. A switching device comprising:
a substrate; and
multiple switches connected on the substrate to provide a switching function,
wherein each respective switch of the multiple switches includes a plurality of ports that utilize a corresponding connection to another switch or to an external device, and wherein the plurality of ports of the respective switch are associated with independently sized buffering queues, wherein a size of a first buffering queue for a first port of the respective switch is different from a size of a second buffering queue for a second port of the respective switch, the size of the first buffering queue being based on the first port being a first type of port, and the size of the second buffering queue being based on the second port being a second type of port different from the first type of port.

2. The switching device of claim 1, wherein a first switch of the multiple switches includes an external port that utilizes a corresponding connection to connect to an external device, and an internal port that utilizes a corresponding connection to connect to an internal port of a second switch of the multiple switches, wherein the external port of the first switch is associated with a buffering queue with a size different from a size of a buffering queue associated with the internal port of the first switch.

3. The switching device of claim 2, wherein the first switch directly connects to an input buffering queue of the second switch.

4. The switching device of claim 2, wherein the size of the buffering queue associated with the internal port of the first switch is less than the size of the buffering queue associated with the external port of the first switch.

5. The switching device of claim 1, wherein the first buffering queue is sized to accommodate a flow of data packets from a remote location.

6. The switching device of claim 1, wherein the substrate is a die or a chip.

7. The switching device of claim 1, wherein the substrate is an interposer.

8. The switching device of claim 1, wherein the substrate is a printed circuit board.

9. The switching device of claim 1, wherein the substrate includes an optical connection to an external device or between individual switches of the multiple switches.

10. The switching device of claim 1, wherein the substrate includes an electrical connection to an external device or between individual switches of the multiple switches.

11. The switching device of claim 1, wherein a first switch of the multiple switches includes a port with a connection to an electrical medium, and a port with a connection to an optical medium, and wherein the first switch includes a first buffering queue associated with the port with the connection to the electrical medium, and a second buffering queue associated with the port with the connection to the optical medium, the first and second buffering queues of the first switch having different sizes dependent upon respective different media of the electrical medium and the optical medium to which the ports of the first switch are connected.

12. A switching device comprising:
multiple substrates; and
multiple switches provided on the multiple substrates,
wherein a first switch of the multiple switches includes a plurality of ports that utilize corresponding connections to another switch or to an external device, and wherein the plurality of ports are associated with independently sized buffering queues comprising a first buffering queue for a first port of the plurality of ports, and a second buffering queue for a second port of the plurality of ports, wherein a first size of the first buffering queue is based on the first port being of a first type of port, and a second size of the second buffering queue is based on the second port being of a second type of port different from the first type of port, the first size different from the second size.

13. The switching device of claim 12, wherein an accounting of credit returns for a particular output port of the plurality of ports is associated to credits for a connecting input port of the plurality of ports and a buffering queue of the connecting input port.

14. The switching device of claim 13, wherein the first port is an external input port that utilizes the corresponding connection to connect to the external device, and the second port an internal output port that utilizes a corresponding connection to connect to an internal input port of a second switch of the multiple switches.

15. The switching device of claim 14, wherein the connection that connects the internal input port of the second switch to the internal output port of the first switch is one of an electrical or optical connection.

16. The switching device of claim 14, wherein the first size is larger than the second size.

17. The switching device of claim 12, wherein a second switch of the multiple switches comprises a third port and a fourth port, the third port to connect to an electrical medium, and the fourth port to connect to an optical medium, and the second switch comprising a third buffering queue having a third size based on the third port being connected to the electrical medium, and a fourth buffering queue having a fourth size based on the fourth port being connected to the optical medium, the third size being different from the fourth size.

18. A method for creating a switching device, the method comprising:
forming multiple switches on a substrate, the multiple switches being interconnected to enable a switching function; and
configuring individual ports of a first switch of the multiple switches to include individually sized buffering queues, wherein a size of a first buffering queue of a first port of the ports is different from a size of a second buffering queue of a second port of the ports, the size of the first buffering queue being based on the first port being a first type of port, and the size of the second buffering queue being based on the second port being a second type of port different from the first type of port.

19. The method of claim 18, wherein the first port is an external port to connect to an external device, and the second port is an internal port to connect to another switch of the switching device.

20. The method of claim 18, wherein the multiple switches are formed on a die.

* * * * *